United States Patent [19]
Jansen et al.

[11] Patent Number: 5,457,267
[45] Date of Patent: Oct. 10, 1995

[54] PROCESS FOR DISPOSING OF HALONS OR HALON-CONTAINING FLUOROCARBONS OR CHLOROFLUOROCARBONS

[75] Inventors: Rolf-Michael Jansen, Kelkheim; Siegismut Hug, Wiesbaden; Hans-Matthias Deger, Hofheim am Taunus, all of Germany

[73] Assignee: Hoechst Aktiengesellschaft, Germany

[21] Appl. No.: 36,672

[22] Filed: Mar. 25, 1993

[30] Foreign Application Priority Data

Mar. 28, 1992 [DE] Germany ............... 42 10 223.5

[51] Int. Cl.$^6$ ............... C01B 7/01; C01B 7/19
[52] U.S. Cl. ............... 588/206; 588/209; 588/212; 423/481; 423/484; 423/488; 423/500
[58] Field of Search ............... 423/484, 481, 423/488, 500, 507; 588/205, 206, 248, 209, 210, 212, 213; 585/469; 208/262.1, 262.5

[56] References Cited

U.S. PATENT DOCUMENTS

| | | | |
|---|---|---|---|
| 3,442,614 | 5/1969 | Frazee et al. | 423/507 |
| 3,875,293 | 1/1975 | Davis | 423/481 |
| 3,919,398 | 11/1975 | Davis | 423/488 |
| 3,959,450 | 5/1976 | Calloue et al. | 423/507 |
| 4,031,194 | 6/1977 | Ogawa et al. | 423/500 |
| 4,125,595 | 11/1978 | Kunze et al. | 423/502 |
| 4,982,039 | 1/1991 | Benson et al. | 585/469 |

FOREIGN PATENT DOCUMENTS

| | | | |
|---|---|---|---|
| 0178001 | 4/1986 | European Pat. Off. | |
| 0212410 | 9/1990 | European Pat. Off. | |
| 0432323 | 6/1991 | European Pat. Off. | |
| 262134 | 11/1988 | German Dem. Rep. | 423/488 |
| 477108 | 9/1975 | U.S.S.R. | 423/500 |
| 1156560 | 7/1969 | United Kingdom | |
| 2243560 | 6/1991 | United Kingdom | |
| WO79/00835 | 10/1979 | WIPO | |

*Primary Examiner*—Michael Lewis
*Assistant Examiner*—N. M. Nguyen
*Attorney, Agent, or Firm*—Connolly & Hutz

[57] ABSTRACT

A process for disposing of bromofluorocarbons, bromochlorofluorocarbons, or mixtures of any of bromofluorocarbons, bromochlorofluorocarbons, fluorocarbons, or chlorofluorocarbons. The process comprises thermally cleaving halons, halon-containing fluorocarbons, or halon containing chlorofluorocarbons, cooling the resulting gas stream, oxidizing the resulting hydrogen bromide to bromine by feeding excess elemental chlorine into the gas stream, absorbing the resulting HF or HCl from the gas stream with recovery of hydrofluoric acid or hydrochloric acid, and finally separating elemental bromine and chlorine from each other by distillation or reducing both to give the salts.

8 Claims, 1 Drawing Sheet

5,457,267

PROCESS FOR DISPOSING OF HALONS OR HALON-CONTAINING FLUOROCARBONS OR CHLOROFLUOROCARBONS

BACKGROUND OF THE INVENTION

Description

Process for disposing of halons or halon-containing fluorocarbons or chlorofluorocarbons.

The invention relates to a process for disposing of bromofluorocarbons or bromochlorofluorocarbons (termed halons below) or mixtures thereof with fluorocarbons (FCs) or chlorofluorocarbons (CFCs).

The object of the invention is to dispose of halons and at the same time to obtain reusable products, such as saleable hydrofluoric acid and hydrochloric acid and elemental bromine or a concentrated bromine-containing salt brine. Although a disposal emergency has arisen among the producers of halon-containing fire extinguishing agents, no process has hitherto been disclosed which meets these requirements and solves the problem of separating from each other the extremely corrosive products resulting, for example, from thermal cleavage of halons.

SUMMARY OF THE INVENTION

It has now surprisingly been found that the above-mentioned object can be achieved by thermally cleaving halons or halon-containing FCs or halon-containing CFCs, for example by means of an oxyhydrogen flame, cooling the resulting gas stream, oxidizing the hydrogen bromide formed in the cleavage to bromine by feeding excess elemental chlorine into the gas stream, absorbing the resulting HF or HCl from the gas stream with recovery of hydrofluoric acid or hydrochloric acid and finally separating elemental bromine and chlorine from each other by distillation or reducing both to give the salts.

The invention therefore relates to a process for disposing of halons (bromofluorocarbons or bromochlorofluorocarbons) or mixtures thereof with fluorocarbons (FCs) or chlorofluorocarbons (CFCs), which comprises a) thermally or photochemically cleaving the halons or mixtures thereof with FCs or CFCs in the presence of a hydrogen source b) cooling the HF- and HBr-containing gas formed in step a) to 5–50° C. and reacting it with at least 1 mol of $Cl_2$ per mole of HBr c) scrubbing the HF from the gas formed in step b), which contains HF, HCl, $Br_2$ and excess $Cl_2$, in an absorption column using water or hydrochloric acid, hydrofluoric acid being obtained at the bottom of the column and a substantially HF-free, HCl-, $Br_2$- and $Cl_2$-containing gas being obtained at the head of the column d) freeing the hydrofluoric acid formed in step c) from entrained bromine in a stripping column using compressed air or steam and then discharging the hydrofluoric acid at the bottom of the column, while withdrawing bromine at the column head in a mixture with air or steam e) scrubbing the HCl from the substantially HF-free gas, formed in step c), in an absorption column using water, hydrochloric acid being obtained at the bottom of the column and a substantially HCl-free, $Br_2$- and $Cl_2$-containing gas being obtained at the head of the column f) freeing the hydrochloric acid formed in step e) from entrained bromine in a stripping column using compressed air or steam and then discharging the hydrochloric acid at the bottom of the column, while withdrawing bromine at the column head in a mixture with air or steam g) jointly compressing the bromine- or bromine- and chlorine-containing gases withdrawn in each case at the column head in steps d)–f) and, as a result, partially condensing them h) distilling in a column the condensed $Br_2/Cl_2$ mixture formed in step g), the $Cl_2$ being withdrawn at the head of the column and the $Br_2$ being withdrawn at the bottom of the column i) subjecting the fraction of the gases not condensed in step g), which contains residual bromine and chlorine, to reduction scrubbing.

However, instead of condensing part of the bromine and part of the excess chlorine and separating this part by distillation, all of the bromine and chlorine which is contained in the gases which were withdrawn at the column head in each case in steps d)–f) can be converted into bromides or chlorides by reduction scrubbing.

The invention therefore further relates to a process for disposing of halons (bromofluorocarbons or bromochlorofluorocarbons) or mixtures thereof with fluorocarbons or chlorofluorocarbons (CFCs), which comprises a) thermally or photochemically cleaving the halons or mixtures thereof with FCs or CFCs in the presence of a hydrogen source b) cooling the HF- and HBr-containing gas formed in step a) to 5–50° C. and reacting it with at least 1 mol of $Cl_2$ per mole of HBr c) scrubbing the HF from the gas formed in step b), which contains HF, HCl, $Br_2$ and excess $Cl_2$, in an absorption column using water or hydrochloric acid, hydrofluoric acid being obtained at the bottom of the column and a substantially HF-free, HCl-, $Br_2$- and $Cl_2$-containing gas being obtained at the head of the column d) freeing the hydrofluoric acid formed in step c) from entrained bromine in a stripping column using compressed air or steam and then discharging the hydrofluoric acid at the bottom of the column, while withdrawing bromine at the column head in a mixture with air or steam e) scrubbing the HCl from the substantially HF-free gas, formed in step c), in an absorption column using water, hydrochloric acid being obtained at the bottom of the column and a substantially HCl-free, $Br_2$- and $Cl_2$-containing gas being obtained at the head of the column f) freeing the hydrochloric acid formed in step e) from entrained bromine in a stripping column using compressed air or steam and then discharging the hydrochloric acid at the bottom of the column, while withdrawing bromine at the column head in a mixture with air or steam g') subjecting the bromine- or bromine-and chlorine-containing gases withdrawn at the column head in each case in steps d)–f) to reduction scrubbing.

The halons (bromofluorocarbons or bromochlorofluorocarbons) disposed of according to the invention generally have 1 to 3 carbon atoms. They can be fully or partially halogenated.

The halons can occur individually or mixed together or in mixtures with FCs or CFCs or both. The FCs and CFCs generally have 1 to 6 carbon atoms and can be fully or partially halogenated.

In step a), the hydrogen source used is preferably hydrogen itself or a hydrocarbon. The thermal cleavage is preferably carried out in a cleavage reactor as described in EP-A-0 2 12 4 10.

In step b), the HF- and HBr-containing gas formed in step a) is cooled to 5–50° C., preferably 5–25° C. and then reacted in a mixing chamber with at least 1 mol of $Cl_2$, preferably 1 to 10 mol of $Cl_2$, in particular 1 to 5 mol of $Cl_2$ per mole of HBr.

In step c), HF is removed by scrubbing with water or hydrochloric acid, preferably 30% strength hydrochloric acid, hydrofluoric acid being formed. Sufficient water or hydrochloric acid is preferably used for scrubbing so that an approximately 50% strength hydrofluoric acid is produced.

In step e), HCl is removed by scrubbing with water in an absorption column which is preferably operated isothermally, hydrochloric acid being formed. Sufficient water is preferably used for scrubbing so that an approximately 30% strength hydrochloric acid is formed.

The stripping columns in steps d) and f) can be operated at reduced pressure, atmospheric pressure or superatmospheric pressure.

In step g), the gases obtained at the heads of the columns in each case in steps d)–f) are preferably compressed to a pressure of 1 to 10 bar, in particular 1 to 6 bar and, as a result, partially liquefied. A temperature of, preferably, 10 to 60° C. in particular 15 to 40° C. is established.

In step h), $Cl_2$ 2 is withdrawn at the head of the column; this is preferably returned to step b).

The reducing scrubbing used in step i) and g') which serves for the purification of waste gas is preferably operated using $SO_2/H_2O$, aqueous bisulfite solution, formic acid or aqueous sodium formate solution.

BRIEF DESCRIPTION OF THE DRAWING

The invention is described in more detail by the example below and FIG. 1.

DETAILED DESCRIPTION OF THE INVENTION

Example

Figure 1:
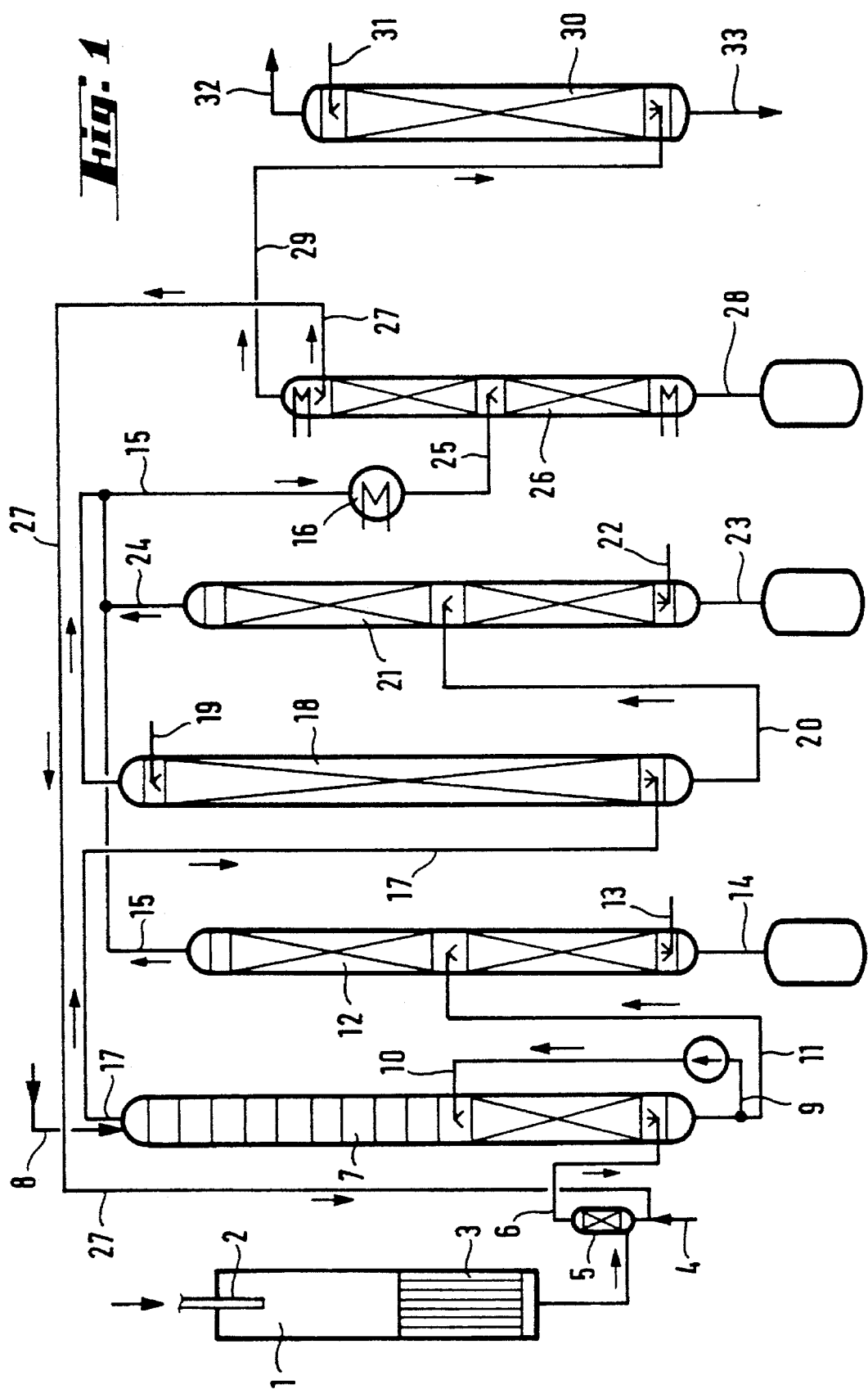
FIG. 1 is a flow chart representing an apparatus according to the present invention.

The cleavage in step a) was carried out in a (R)Diabon tube (1) (length=800 mm, diameter: 48 mm) which was furnished at the top end with a burner nozzle (2) having an electrical ignition device. 100 g/h of a halon-containing CFC mixture (40% by weight of dichlorodifluoromethane R 12, 50% by weight of trichlorofluoromethane R11, 10% by weight of bromotrifluoromethane R13B1) were cleaved with the aid of oxyhydrogen gas (35 l/h of $H_2$, 10.5 l/h of $O_2$). A plate heat exchanger (3) (length=400 mm) made of Diabon was mounted at the bottom end of the Diabon tube (1), in which heat exchanger the hot gases resulting from cleavage were cooled to room temperature and partially liquefied. Downstream of the heat exchanger (3), chlorine was continuously added (1 l/h) via line (4) and the mixture was then passed through a nickel tube (5) (length=200 mm, diameter=20 mm) serving as a mixing section and equipped with nickel wire meshes (diameter=4 mm). The mixture was then conducted via line (6) into the HF absorption column (7) (length=1,500 mm, diameter=30 mm; PTFE-lined steel column having a side feed branch and head cooler and PP Raschig rings of 4 mm diameter as packing). 300 ml/h of 30% strength hydrochloric acid was fed in continuously via line (8) at the column head. A part-stream (approximately 50 ml/h) was branched off, via line (9), from the aqueous HF (approximately 200 ml/h) discharging from the bottom end of column (7) and pumped to the side feed branch (10). The main part of the aqueous HF still containing bromine was passed via line (11) into the HF stripping column (12) (length=1,500 mm, diameter=30 mm; PTFE-lined steel column having a side feed branch and head cooler and PP Raschig rings of 4 mm diameter as packing) through which approximately 0.6 $m_3$/h of air flowed which was introduced via line (13). The aqueous HF discharging at the column bottom via line (14) still had a residual bromine content of 10–500 ppm. The gases departing at the head of the column (12) (cooled to approximately 20° C.) were conducted via line (15) into the cooler (16). The gas mixture leaving the head of the HF absorption column (7) was passed via line (17) into the HCl absorption column (18) (length=1,500 mm, diameter=30 mm; PTFE-lined steel column with head cooler and PP Raschig rings of 4 mm diameter as packing) operated at ambient temperature, into which 300 g/h of water were continuously fed via line (19). Gases leaving the head of the column (18) were passed in line (15) and conducted through this into the cooler (16). The aqueous HCl still containing bromine was withdrawn at the bottom of column (18) and passed via line (20) into the HCl stripping column (21) (length=1,500 mm, diameter=30 mm; PTFE-lined steel column having a side feed branch and head cooler and PP Raschig rings of 4 mm diameter as packing), through which approximately 0.6 $m^3$/h of air flowed which was introduced through line (22). The aqueous HCl discharging at the bottom of column (21) via line (23) still had a residual bromine content of 5–100 ppm. The gases leaving the column head (cooled to approximately 20° C.) via line (24) were conducted via line (24) and (15) into the cooler (16). The incoming gases were cooled there to 5–10° C. and then passed via line (25) into the column (26) (length=2,000 mm, diameter=30 mm; glass column having side feed branch and head cooler and Raschig rings of 4 mm diameter as packing). Chlorine was withdrawn as a liquid (−78° C.) at the cooled column head via line (27) and returned to the mixing section (5). Elemental bromine collected at the bottom of column (26) and was withdrawn via line (28). The incondensable waste gas was passed via line (29) into the bisulfite scrubber (30) (length=2,000 mm, diameter=30 mm; glass column having head cooler and Raschig rings of 4 mm diameter as packing) into which 500 ml/h of 20% strength bisulfite solution were continuously added via line (31). Only traces of halogens (in total less than 5 ppm) could be detected in the waste gas of the scrubber (30) which departed via line (32). The effluent from the scrubber (30) was withdrawn via line (33), which effluent contained the bromide and chloride formed by reduction of residual bromine and chlorine.

We claim:

1. A process for disposing of halons including bromofluorocarbons, or bromochlorofluorocarbons, or mixtures of bromofluorocarbons or bromochlorofluorocarbons with fluorocarbons (FCs) or chlorofluorocarbons (CFCs), which comprises a) thermally or photochemically cleaving the halons or mixtures thereof with FCs or CFCs in the presence of a hydrogen source to form an HF- and HBr-containing gas;

b) cooling the HF- and HBr- containing gas formed in step a) to 5–50° C. and reacting it with at least 1 mol of $Cl_2$, per mole of HBr to form a gas which contains HF, HCl, $Br_2$, and excess $Cl_2$;

c) scrubbing the HF from the gas formed in step b), in an absorption column using water or hydrochloric acid in a manner such that hydrofluoric acid is obtained at the bottom of the column and a substantially HF-free, HCl-, $Br_2$- and $Cl_2$-containing gas is obtained at the head of the column;

d) freeing the hydrofluoric acid formed in step c) from entrained bromine in a stripping column using compressed air or steam and then discharging the hydrofluoric acid at the bottom of the column, while withdrawing bromine at the column head in a mixture with air or steam;

e) scrubbing the HCl from the substantially HF-free gas, formed from step c), in an absorption column using water, in a manner such that hydrochloric acid is obtained at the bottom of the column and a substantially HCl-free, $Br_2$- and $Cl_2$-containing gas is obtained at the head of the column;

f) freeing the hydrochloric acid formed in step e) from entrained bromine in a stripping column using compressed air or steam and then discharging the hydrochloric acid at the bottom of the column head in a mixture with air or steam;

g) jointly compressing the gases withdrawn in each case at the column head in steps d)–f) and, as a result, partially condensing them while leaving a fraction of the gases not condensed;

h) distilling in a column the condensed $Br_2/Cl_2$ mixture formed in step g), the $Cl_2$ being withdrawn at the head of the column and the $Br_2$ being withdrawn at the bottom of the column;

i) subjecting the fraction of the gases not condensed in step g), which contains residual bromine and chlorine to reduction scrubbing.

2. A process for disposing of halons including bromofluorocarbons, or bromochlorofluorocarbons, or mixtures of bromofluorocarbons or bromochlorofluorocarbons with fluorocarbons (FCs) or chlorofluorocarbons (CFCs), which comprises a) thermally or photochemically cleaving the halons or mixtures thereof with FCs or CFCs in the presence of a hydrogen source to form an HF- and HBr-containing gas;

b) cooling the HF- and HBr- containing gas formed in step a) to 5–50° C. and reacting it with at least 1 mol of $Cl_2$ per mole of HBr to form a gas which contains HF, HCl, $Br_2$, and excess $Cl_2$;

c) scrubbing the HF from the gas formed in step b), in an absorption column using water or hydrochloric acid in a manner such that hydrofluoric acid is obtained at the bottom of the column and a substantially HF-free, HCl-, $Br_2$- and $Cl_2$-containing gas is obtained at the head of the column;

d) freeing the hydrofluoric acid formed in step c) from entrained bromine in a stripping column using compressed air or steam and then discharging the hydrofluoric acid at the bottom of the column, while withdrawing bromine at the column head in a mixture with air or steam;

e) scrubbing the HCl from the substantially HF-free gas, formed from step c), in an absorption column using water, in a manner such that hydrochloric acid is obtained at the bottom of the column and a substantially HCl-free, $Br_2$- and $Cl_2$-containing gas is obtained at the head of the column;

f) freeing the hydrochloric acid formed in step e) from entrained bromine in a stripping column using compressed air or steam and then discharging the hydrochloric acid at the bottom of the column head in a mixture with air or steam;

g) subjecting the gases withdrawn at the column head in each case in steps d)–f) to reduction scrubbing.

3. The process as claimed in claim 1, wherein the halons have 1 to 3 carbon atoms.

4. The process as claimed in claim 2, wherein the halons have 1 to 3 carbon atoms.

5. The process as claimed in claim 1, wherein the FCs and CFCs have 1 to 6 carbon atoms.

6. The process as claimed in claim 2, wherein the FCs and CFCs have 1 to 6 carbon atoms.

7. The process as claimed in claim 1, wherein, in step a), 1 to 5 mol of $Cl_2$ are used per mole of HBr.

8. The process as claimed in claim 2, wherein, in step a), 1 to 5 mol of $Cl_2$ are used per mole of HBr.

* * * * *